US010255929B2

(12) United States Patent
Matthews, III et al.

(10) Patent No.: US 10,255,929 B2
(45) Date of Patent: *Apr. 9, 2019

(54) MEDIA PRESENTATION PLAYBACK ANNOTATION

(71) Applicant: Microsoft Technology Licensing, LLC, Redmond, WA (US)

(72) Inventors: Joseph H. Matthews, III, Woodinville, WA (US); Udiyan Padmanabhan, Seattle, WA (US); Jannes Paul Peters, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/141,503

(22) Filed: Apr. 28, 2016

(65) Prior Publication Data

US 2016/0247523 A1  Aug. 25, 2016

Related U.S. Application Data

(63) Continuation of application No. 13/110,292, filed on May 18, 2011, now Pat. No. 9,342,516.

(51) Int. Cl.
*G06F 17/00* (2006.01)
*G10L 25/57* (2013.01)
(Continued)

(52) U.S. Cl.
CPC .............. *G10L 25/57* (2013.01); *G06F 3/005* (2013.01); *G06F 3/012* (2013.01); *G06F 3/017* (2013.01); *G06F 3/165* (2013.01); *G06F 3/167* (2013.01); *G06F 17/241* (2013.01); *G06F 17/30038* (2013.01); *G10L 21/10* (2013.01); *G10L 2025/783* (2013.01)

(58) Field of Classification Search
CPC .................................. G10L 15/22; H04N 5/76
USPC ......................................... 715/233, 202, 200
See application file for complete search history.

(56) References Cited

U.S. PATENT DOCUMENTS 5,838,313 A    11/1998  Hou et al.
6,295,391 B1    9/2001  Rudd et al.
(Continued)

OTHER PUBLICATIONS

"Final Rejection Issued in U.S. Appl. No. 13/110,292", dated Apr. 22, 2013, 17 Pages.
(Continued)

*Primary Examiner* — Manglesh M Patel
(74) *Attorney, Agent, or Firm* — Klarquist Sparkman, LLP

(57) ABSTRACT

Annotations can be automatically added to a media presentation during playback of the presentation without a user having to manually interact with the playback device. The playback device determines whether an annotation is to be added to the media presentation based on characteristics of voice input received at the device, such as voice input signal strength or variances in the voice input signal strength. Characteristics of video input received at the device can be used to determine whether a user is speaking to the computing device as well. The device can handle a new annotation overlapping an existing annotation by either removing the existing annotation or by shifting the existing annotation until there is no more overlap. A media presentation can comprise multiple annotation tracks.

19 Claims, 6 Drawing Sheets

(51) Int. Cl.
*G06F 17/30* (2006.01)
*G06F 3/00* (2006.01)
*G06F 3/01* (2006.01)
*G06F 3/16* (2006.01)
*G06F 17/24* (2006.01)
*G10L 21/10* (2013.01)
*G10L 25/78* (2013.01)

(56) References Cited

U.S. PATENT DOCUMENTS

| | | | |
|---|---|---|---|
| 6,397,181 | B1 | 5/2002 | Li et al. |
| 6,452,615 | B1 | 9/2002 | Chiu et al. |
| 6,675,352 | B1* | 1/2004 | Osaki .................. A61B 6/468 715/203 |
| 6,956,593 | B1 | 10/2005 | Gupta et al. |
| 7,324,943 | B2 | 1/2008 | Rigazio et al. |
| 7,493,559 | B1 | 2/2009 | Wolff et al. |
| 8,194,102 | B2 | 6/2012 | Cohen et al. |
| 2002/0099552 | A1 | 7/2002 | Rubin et al. |
| 2003/0024975 | A1 | 2/2003 | Rajasekharan |
| 2006/0041926 | A1 | 2/2006 | Istvan et al. |
| 2007/0038458 | A1 | 2/2007 | Park |
| 2008/0154908 | A1 | 6/2008 | Datar et al. |
| 2008/0281592 | A1* | 11/2008 | McKoen .......... G06F 17/30781 704/235 |
| 2009/0119100 | A1 | 5/2009 | Akella et al. |
| 2009/0282371 | A1* | 11/2009 | Curl .................. G06F 19/00 715/863 |
| 2010/0037149 | A1 | 2/2010 | Heath |
| 2010/0058181 | A1 | 3/2010 | Ganesan et al. |
| 2010/0123737 | A1 | 5/2010 | Williamson et al. |
| 2010/0324709 | A1 | 12/2010 | Starmen |
| 2011/0131535 | A1 | 6/2011 | Tagami et al. |
| 2013/0324243 | A1* | 12/2013 | Mikhailov .............. A63F 13/04 463/31 |
| 2016/0210411 | A1* | 7/2016 | Mentis .................. G06F 19/321 |

OTHER PUBLICATIONS

"Final Rejection Issued in U.S. Appl. No. 13/110,292", dated May 20, 2015, 19 Pages.

"Non Final Office Action Issued in U.S. Appl. No. 13/110,292", dated Sep. 4, 2014, 16 Pages.

"Non Final Office Action Issued in U.S. Appl. No. 13/110,292", dated Sep. 19, 2012, 15 Pages.

"Notice of Allowance Issued in U.S. Appl. No. 13/110,292", dated Jan. 20, 2016, 9 Pages.

Ades, "Voice Annotation and Editing in a Workstation Environment," *Proceedings of the AVIOS '86 Voice Input/Output Systems Applications Conference*, pp. 13-28 (Sep. 16-18, 1986).

\* cited by examiner

MEDIA PRESENTATION PLAYBACK ANNOTATION

CROSS REFERENCE TO RELATED APPLICATION

This application is a continuation of U.S. patent application Ser. No. 13/110,292, filed on May 18, 2011, which is incorporated herein by reference.

BACKGROUND

People assemble images, audio, video and other media into presentations for various reasons—for professional presentations, to memorialize family events or simply for entertainment. Once assembled, audio annotations can be added to these media presentations to provide narration or to capture a viewer's response to the presentation. Adding audio annotations to a media presentation typically involves using multimedia editing features of a camera or camcorder, or dedicated multimedia editing software executing on a computer, features that generally allow annotations to be made in an "annotation" or "edit" mode that is separate from a "playback" mode. Multimedia editing software or features are controlled through a user's manual interactions with a computing device, such as hitting keys on a keyboard, operating a mouse or touching a touchscreen. This manual interaction allows a user to control the selection of media elements (images, videos, etc.) for inclusion in a presentation, where in a media presentation audio annotations are to be added, and the recording, editing and storing of annotations.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

The tools and techniques described herein allow annotations to be automatically captured and added to a media presentation while the media presentation is being played, so that presentations can be annotated in a simple and efficient manner and a greater portion of media consumers can become media creators as well.

In one embodiment, a media capture device such as a camera plays a media presentation that has already been created. A media presentation can begin playing in response to input from a user, such as the user hitting a "play" button, or selecting a "play" user interface element with a mouse or by tapping a "play" element on a touchscreen. The media presentation can begin playing from any point in the media presentation and annotation can be captured during the playing of any portion of the media presentation. Once the playing begins, the device listens for voice input and determines whether any received voice input qualifies as an annotation. The device can distinguish between voice input meant to be an annotation and voice input that is part of a conversation with another viewer. The device can determine whether voice input is an annotation by determining if the viewer is speaking in the direction of the device, which can be based on the voice input signal strength or variations in the voice input signal strength. If the device detects an annotation, the annotation is added to the media presentation as a media element, and is synchronized with the media elements that were playing while the annotation was made.

In another embodiment, the device can determine whether voice input is to be captured as an annotation based on video input received at the device as well as the received voice input. For example, a device can use its front facing camera to infer that a user is viewing the device display e and use this information in determining whether voice input should be captured as an annotation. The received video input can be captured as part of the annotation.

Accordingly, annotations can be captured during media presentation playback through a natural interface. Annotations can be captured and added to the presentation based on voice input and video input received by a device. Manual user interaction, such as operating buttons, a mouse, keyboard or touchscreen are not required. The display is free of traditional user interface elements relating to annotation capture, providing the viewer with a simplified annotation capture experience.

The foregoing and other objects, features and advantages of the invention will become more apparent from the following Detailed Description, which proceeds with reference to the accompanying figures.

DETAILED DESCRIPTION

Example 1—Exemplary Computing Device

Figure 1:
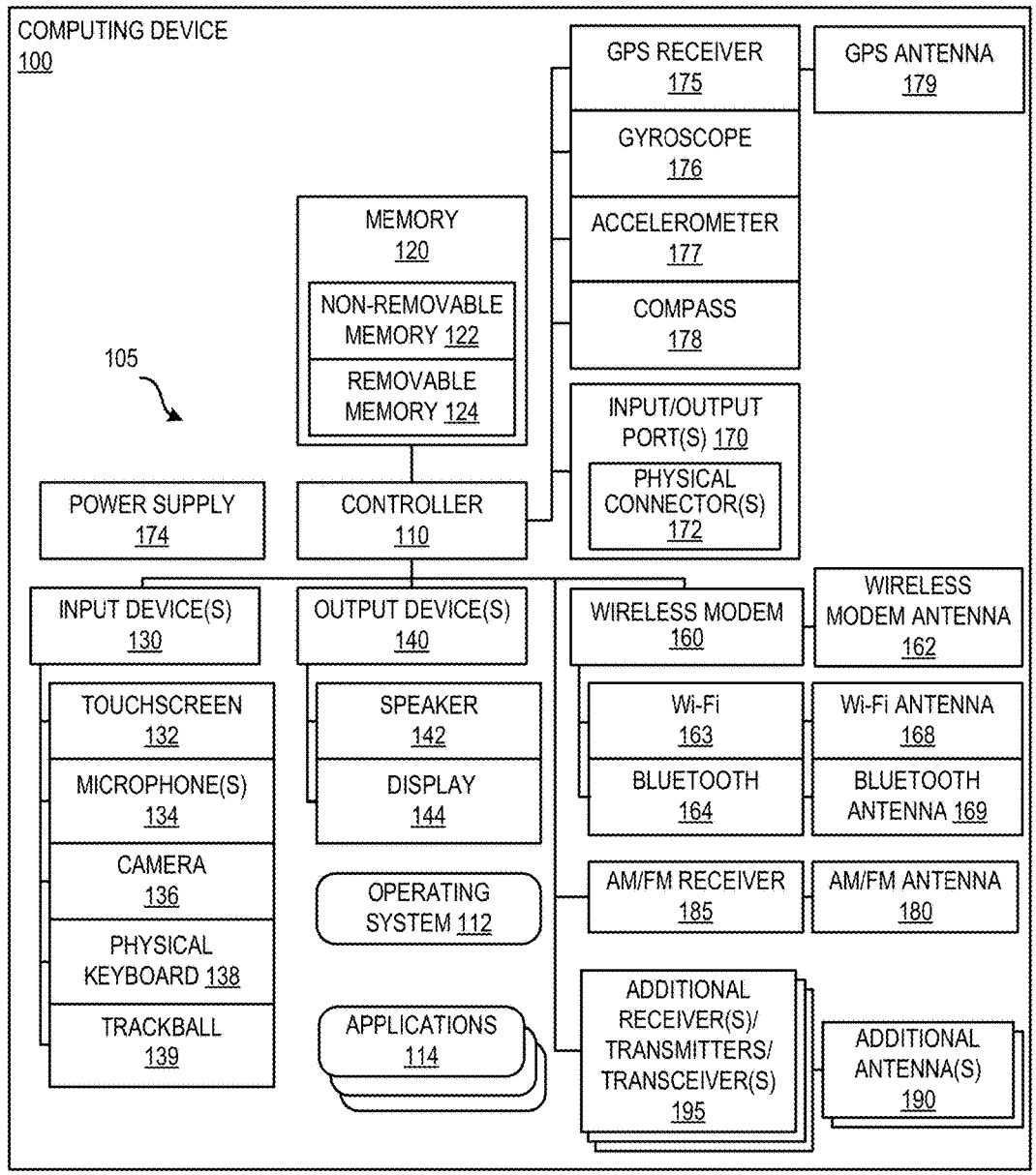
FIG. 1 is a system diagram depicting an exemplary computing device.

FIG. 1 is a system diagram depicting an exemplary computing device 100 that can be used to perform any of the methods described herein. The computing device 100 can include a variety of optional hardware and software components 105. Generally, components 105 can communicate with other components, although not all connections are shown, for ease of illustration. The computing device 100 can be any computing device capable of capturing and playing media including mobile computing devices (e.g., smartphones; handheld, laptop, netbook, tablet and slate computers) and non-mobile computing devices (e.g., desktop computers, servers, gaming consoles, smart televisions). The computing device 100 can allow wired or wireless communication with one or more networks, such as a wireless cellular or satellite network.

The computing device 100 can include a controller or processor 110 (e.g., digital signal processor (DSP), graphics processing unit (GPU), microprocessor, ASIC, or other control and processing logic circuitry or software) for performing such tasks as signal processing, signal coding, graphics processing, data processing, input/output processing, power control and other functions. An operating system 112 can control the allocation and usage of the components 105 and support for one or more application programs 114. The application programs 114 can include common mobile computing applications (e.g., media capture and playback applications, email applications, calendars, contact managers, web browsers, messaging applications) as well as other computing applications.

The computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards (e.g., SD (Secure Digital) cards), memory sticks, a Subscriber Identity Module (SIM) card, which is well known in GSM (Global System for Mobile Communication) systems, or other well-known memory storage technologies, such as "smart cards." The memory 120 can be used for storing data and/or computer-executable instructions for running the operating system 112 and the application programs 114 on the device 100. Example data can include web pages, text, images, sound files, video data or other data sets to be sent to and/or received from one or more network servers or other devices by the computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can have access to external memory (not shown) such as an external hard drive.

The computing device 100 can support one or more input devices 130, such as a touch screen 132, one or more microphones 134, one or more cameras 136 (e.g., front and rear facing cameras), physical keyboard 138 and trackball 139 and one or more output devices 140, such as a speaker 142, a display 144. Other possible output devices (not shown) can include piezoelectric or other haptic output devices. Any of the input devices 130 and output devices 140 can be internal to, external to, or removably attachable with the computing device 100 such as an external display or an attachable microphone. External input and output devices 130 and 140 can communicate with the computing device 100 via a wired or wireless connection. Some devices can serve more than one input/output function. For example, touchscreen 132 and display 144 can be combined in a single input/output device.

The computing device 100 can provide one or more natural user interfaces. For example, the operating system 112 or applications 114 can possess speech-recognition capabilities as part of a voice user interface that allows a user to operate the device 100 via voice commands. Further, the device 100 can possess gesture recognition capabilities. For example, a device 100 can detect user facial, hand or body gestures to provide input to gaming or other applications.

A wireless modem 160 can be coupled to a wireless modem antenna 162 and can support two-way communications between the computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as GSM network for data and voice communications within a single cellular network, between cellular networks, or between the computing device and a public switched telephone network (PSTN). The computing device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175. Mobile computing devices can further comprise a gyroscope 176, an accelerometer 177 or a compass 178. The GPS receiver 175 can be coupled to a GPS antenna 179. The computing device 100 can additionally include an AM/FM antenna 180 coupled to an AM/FM receiver 185 for receiving radio signals broadcast by an AM/FM radio signal transmitter. The computing device 100 can further include one or more additional antennas 190 coupled to one or more additional receivers, transmitters and/or transceivers 195 to enable various additional functions. For example, computing device 100 can include an additional antenna 190 coupled to an additional receiver 195 configured to receive and process a digital audio radio service (DARS) signal for output at the computing device 100 or an attached accessory.

The illustrated components 105 are not required or all-inclusive, as any components can be deleted and other components can be added.

Example 2—Exemplary Cloud Computing Environment

Figure 2:
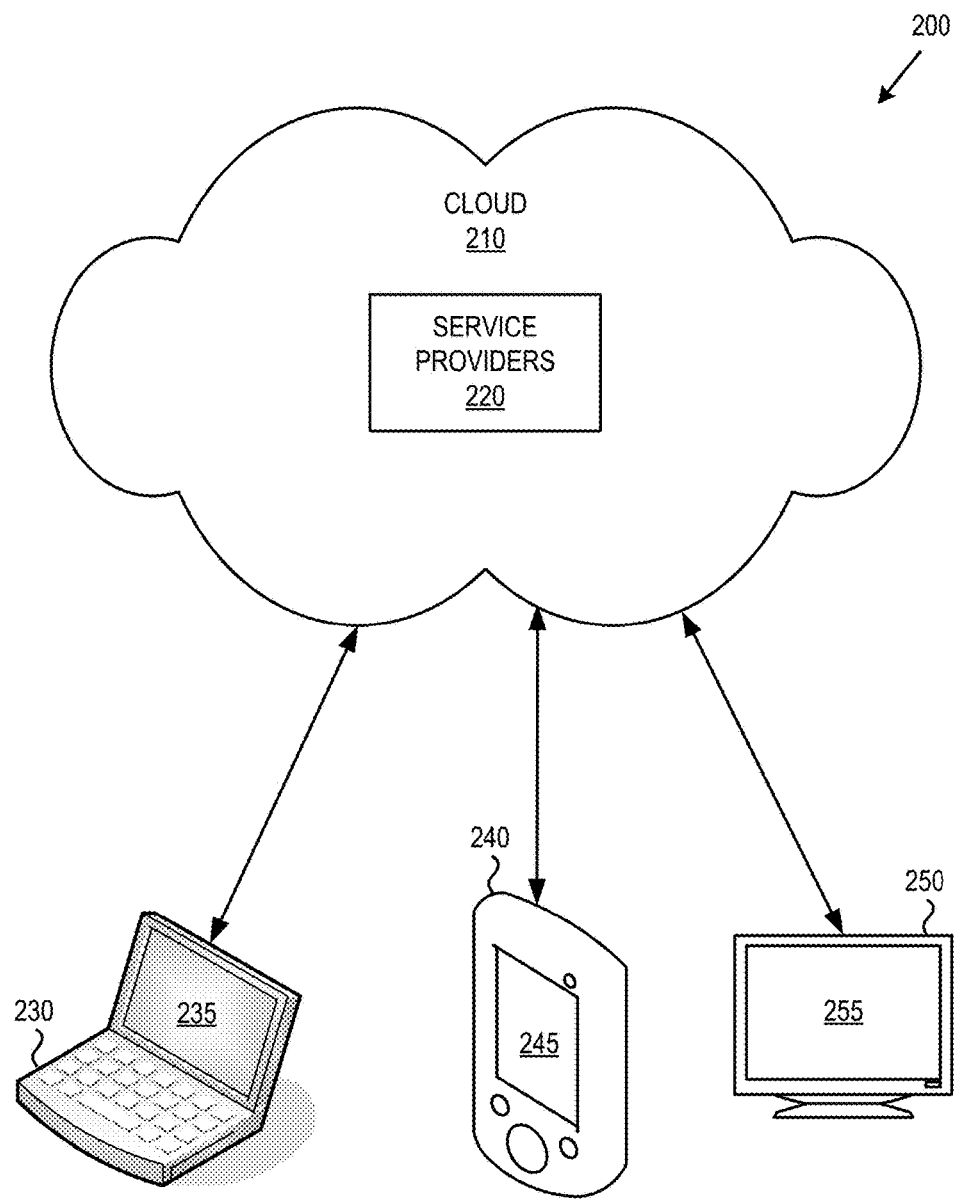
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., determining whether received voice input comprises an annotation) can be performed on computing devices (e.g., connected devices 230, 240, 250) while other tasks (e.g., storage of media presentation files) can be performed in the cloud 210.

In example environment 200, the cloud 210 provides services for connected computing devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a computing device with a computing device screen 245 (e.g., a small-size screen). For example, connected device 240 could be a digital camera, camcorder, smart phone, personal digital assistant or the like. Connected device 250 represents a device with a large screen 255. For example, connected device 250 could be a television with Internet connectivity (e.g. a smart television), or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, file storage, email, Short Message Service (SMS), Multimedia Message Service (MMS), social networking, data storage and website hosting. The service providers can host online marketplaces offering wide varieties of goods and services such as software applications and upgrades and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Example 3—Exemplary Annotation System

Figure 3:
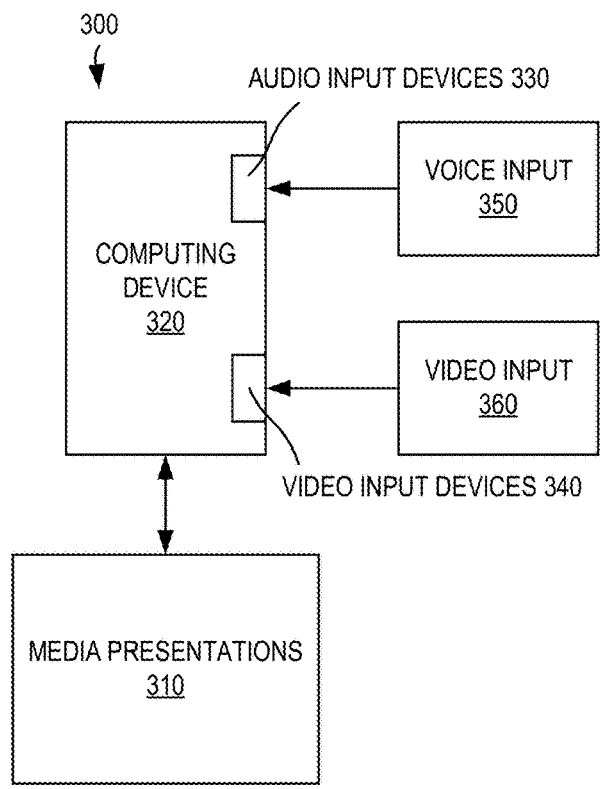
FIG. 3 is a block diagram of an exemplary media presentation playback annotation system.

FIG. 3 is a block diagram of an exemplary system 300 for annotating a media presentation 310. The system 300 comprises a computing device 320 that comprises audio input devices 330 and video input devices 340. The computing device 320 is configured to annotate the media presentation 310 during playback of the presentation 310 at the computing device 320 based on voice input 350 received at the audio input devices 330 and video input 360 received at the video input devices 340. In some embodiments, video input 360 is not used in determining whether voice input 350 comprises an annotation. In some embodiments, the computing device 320 determines whether voice input 350 comprises an annotation based on characteristics of only the voice input 350. In other embodiments, the computing device 320 determines whether voice 350 comprises an annotation based on characteristics of only the voice input 350 and the video input 360. In other embodiments, characteristics of the video input 360 are also considered in determining whether voice input 350 comprises an annotation.

The audio input devices 330 can be a microphone or any other audio input device and can comprise one or more audio input devices. The video input devices 340 can be a camera or any other device capable of capturing video and can comprise one or more video input devices. In some embodiments, the audio input devices 330 and video input devices 340 can comprise input devices external to the computing device. In some embodiments, the computing device can comprise input devices that are capable of determining the three-dimensional profile of objects within the field of the device.

Example 4—Exemplary Media Presentation

In any of the examples described herein, a media presentation is a collection of one or more media elements that are played back to a user in sequence. Media elements can be of any kind of media such as audio, images, videos and documents (e.g., word processing documents, spreadsheets, Microsoft Powerpoint® presentations). The sequence in which media elements are arranged in a presentation can be the order in which the elements were captured, a user-specified order, or any other sequence. For example, a media presentation can be a collection of images and video clips arranged according by the time that the images and videos were taken. In some embodiments, a media presentation can comprise a single media element. For example, a media presentation can consist of a single image, a single video or a single document. A media presentation can be created automatically by any of the computing devices described herein.

Example 5—Exemplary Media Presentation Playback Annotation

In any of the examples described herein, a media presentation can be annotated by a user while the presentation is being played at a computing device. An annotation is a media element of a media presentation. Annotations comprise narration or other voice input made by the user while the presentation is being played.

When playback of a media presentation begins, the computing device performing the playback (the playback device) begins monitoring the audio input devices for voice input. If the device detects voice input, the device then determines whether the voice input comprises an annotation to be added to the presentation. Determining when to capture voice input as an annotation is based on the voice input and, in some embodiments, video input received at the playback device. Once an annotation is determined to exist, the computing device determines the start and stop times of the annotation and which media elements were playing while the annotation was made so that the annotation can be synchronized with those media elements. The voice input comprising the annotation is then stored and added to the media presentation as an annotation.

An annotation is added to a media presentation by updating the annotation data in a media presentation master file with a reference to an annotation file containing the annotation. Annotation information can comprise additional information such as the time during presentation playback the annotation is to be played, the media elements that the annotation is associated with (i.e., those media elements that were playing while the annotation was being captured) and additional information about the annotation (e.g., when it was recorded, who recorded the annotation, where the annotation was recorded).

In some embodiments, interface elements relating to annotation are absent from the computing device display during media presentation playback. In some embodiments, annotations can be captured without manual interaction with the computing device. Thus, a user is allowed to sit back and enjoy a media presentation, uncluttered with user interface elements, knowing that narration and other verbal responses provided by the viewers directed to the computing device during playback will be added to the presentation as annotation. By allowing for the capture of annotations while a presentation is being played back allows for a viewer's spontaneous reactions to the presentation to be captured. This spontaneity can be lacking in situations where a user has to stop the playback and fiddle with manual controls to start the recording of an annotation. In some embodiments, the computing device can display an element in the computing device display indicating when an annotation is being captured (e.g., a flashing red dot, "recording" text). In some embodiments, the computing device can present user elements that provide the user with the ability to capture, edit or remove annotations outside of media presentation playback.

Annotations comprise data representing the voice input received at the audio input devices. In some embodiments, and where the computing device comprises video input devices, annotations can further comprise data representing video input received at the video input devices.

Example 6—Exemplary Method of Annotating a Media Presentation During Playback

Figure 4:
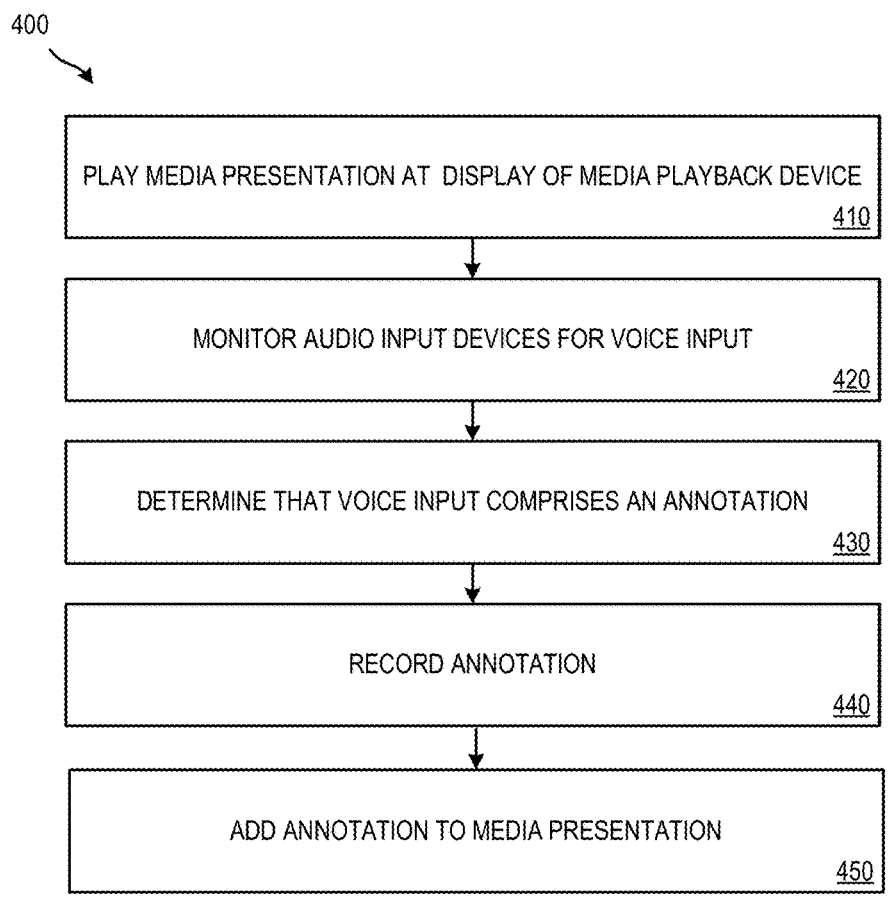
FIG. 4 is a flowchart of an exemplary method of media presentation playback annotation.

FIG. 4 is a flowchart of an exemplary method 400 of annotating a media presentation during playback. At 410, at least a portion of the media presentation is played at a display of a computing device comprising one or more audio input devices. A media presentation can be annotated when any portion of the presentation is played back. At 420, the one or more audio input devices are monitored for voice input received during the playing. At 430, the voice input is determined to comprise an annotation to be added to the media presentation. At 440, in response to the determination, the annotation is recorded. At 450, the annotation is added to the media presentation.

In alternatives to method 400, the computing device can further comprise one or more video input devices and determining that the voice input comprises an annotation is based at least in part on the video input received at the video input devices.

Example 7—Exemplary Media Presentation File Structure

Figure 5:
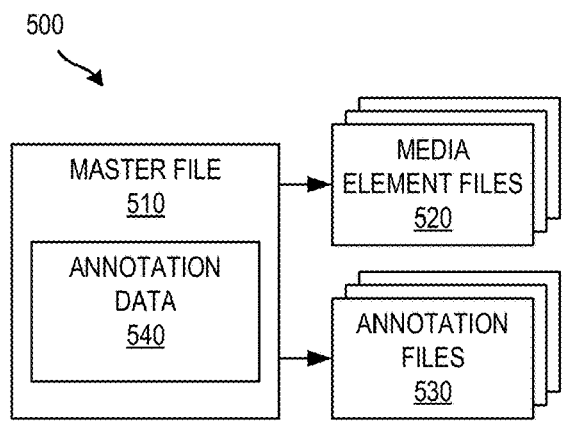
FIG. 5 is a block diagram of an exemplary media presentation file structure.

FIG. 5 is a block diagram 500 of an exemplary media presentation file structure 500 that can be used in any of the examples described herein. The file structure 500 comprises a master file 510 comprising references to one or more media element files 520 and one or more annotation files 530. The media element files 520 contain data representing the various media elements comprising the media presentation. The annotation files 530 contain data representing the annotations to the presentation.

The master file 510 further comprises annotation data 540, which includes data indicating at which points during media presentation playback annotations are to be played. The annotation data 540 can indicate the absolute position within a media presentation that an annotation is to be played (e.g., three minutes after the media presentation starts) or a position relative to when one of the media elements is scheduled to start playing (e.g., 10 seconds after video A begins playing). The annotation data is updated as the media presentation is updated, such as when media elements are edited, added to the presentation, moved to a different point in the presentation, removed from the presentation, or deleted from memory. If an annotation spans multiple media elements, the full annotation can be associated with the multiple elements such that if any of the multiple elements are moved, the full annotation remains associated with the multiple elements, or the annotation is broken up among the multiple elements. Alternatively, the multiple elements can be forced to be kept together. That is, if one of several elements associated with an annotation is moved, the other elements associated with the annotation are moved with it.

The master file 510, media element files 520 and annotation files 530 can be stored internal, local or remote to a computing device. In one example, a laptop computer stores master files, media elements files and annotation files in internal memory. In another example, a smart phone stores a media file and the constituent media element files and annotation files are stored remotely over a local network or by a cloud-based service. The capability of media presentation files to be distributed allows for the conservation of computing device is internal or local memory, and allows for media presentations to be played back at any network or Internet-accessible device.

In another example, the media presentation files are located in the cloud. A mobile device user can access a cloud-based service that has access to various master files, select a media presentation for playback at the mobile device, and the cloud-based service can stream the presentation to the mobile device, accessing media element and annotations files wherever they are stored. The master, element and annotation files can be distributed across multiple remote locations such as various cloud-based services. Master files can be updated as its position relative to its constituent media element files and annotation files changes. Annotation and media element files can be used in multiple media presentations and thus can be referenced by multiple master files.

In some embodiments, multimedia processing software can create a single media presentation file in a conventional multimedia format (e.g., .wma, .wmv, .mpeg, .mov) based on a master file and referenced media element and annotation files. In some embodiments, an audio annotation to a video media element is captured by adding the audio annotation to the corresponding video media element file. Annotation files are not created for annotations that are captured in this fashion. The audio annotation can be leveled based on the existing audio in the video media element. The existing audio can be processed as part of adding the audio annotation to the video element. For example, the existing audio can be ducked behind the audio annotation.

Example 8—Exemplary Determining that Voice Input Comprises an Annotation

In any of the examples described herein, voice input received at audio input devices during presentation playback can be determined to comprise an annotation based on voice input characteristics. Determining that voice input comprises an annotation can comprise determining that a user is talking towards the computing device. That is, the viewer is speaking in the direction of the device. A viewer does not need to have his or her head directly in-line with the audio input devices or the display of the device; some variation in the direction of the voice can be allowed. For example, the device can determine that a viewer speaking within 10, 20, 45 degrees or any other deviation from the normal extending from the user's face to the computing device is still speaking to the device.

Determining that a user is speaking in the direction of the computing device can be based at least in part on the strength of the voice input received at the audio devices, or on variations in voice input strength. Voice input strength can be any other measure of voice signal strength such as peak-to-peak amplitude, peak amplitude, root mean square amplitude and the like. Variations in voice input strength can be determined at one audio input device, or as one or more variations across multiple audio input devices.

Voice input can be discarded if it is not determined to be suitable for being used as an annotation. For example, the device can determine that voice input is present, but that it is indistinguishable from background noise or other audio sources, or that the voice input comprises more than one voice.

In some embodiments, in a computing device with one microphone, a device can determine that a user is speaking in the direction of the device if the voice input strength exceeds a threshold. This threshold can be determined based on measurements that indicate that voice input strength above a threshold indicates that a viewer is speaking to the device. The device can optionally require that the variation in the received voice input strength does not vary more than a certain amount while voice input is being received. For example, the device can be configured to require that voice input signal strength does not vary by more than 10%, 20%, 30% or any other amount that indicates the user is speaking towards the device, in order for voice input to be determined to be an annotation.

In devices with stereo microphones, which could be located on the same side (both forward-facing) (i.e., toward the user) or on different faces of the device (front/back or left/right), a variation or differential in the voice input signal strength across the two speakers can indicate the direction of speech. For example, stronger voice input signals received at a left audio input device relative to that received at a right audio input device can indicate that a user is speaking in the direction of the left microphone, which can indicate that the viewer is speaking to another person and that the voice input is part of a conversation, rather than as an annotation. In a device with stereo microphones mounted on the front and back of the device, voice input determined to be coming from the back of a device can be similarly discarded.

The device can comprise any number of audio input devices located in any arrangement and can utilize differences in the voice input signals received at any number of audio input devices to determine whether the viewer is talking to the device. Multiple microphones can provide greater voice input fidelity as they provide more information about the audio source. For example, multiple microphones can allow for the cancellation of background noise, which provides for a higher fidelity audio annotation.

Detecting the direction in which a user is speaking can allow a computing device to filter voice input received during presentation playback not intended as an annotation. For example, if a user is watching a media presentation with a friend, and, while commenting on the media presentation to the friend, the user turns his head back and forth between the device display and the friend, the camera can detect the user's head movement and determine that what the user is saying is part of a conversation and not an annotation. Conversely, if the device detects voice input that maintains a high signal strength with little variation for the duration that voice input is detected (i.e., until the device detects the next period of silence), the device can determine that the voice input is meant to be an annotation.

Determining whether voice input comprises an annotation can be based on any combination of factors described herein. For example, a device can rely on voice input signal strength alone, voice input signal strength and variations, voice input characteristics combined with video input characteristics, etc. For example, a computing device can be configured such that an annotation is captured and added to a presentation when both voice input and video input data indicates that the user in speaking in the direction of the camera. In another example, the computing device can look to additional voice and video input characteristics when other input characteristics are dispositive on whether voice input comprises an annotation. For example, if a computing device cannot determine whether a user is speaking in the direction of the device based on voice input signal strength, the device can then look to video input characteristics to determine the direction of the user's voice.

Audio processing can be performed on annotations after they have been captured. For example, audio annotation can be processed to remove "pops" (due to the voice input being too loud) and other audio noise or artifacts, such as background noise in the voice input. Background noise can include voices in the media elements being played when the annotation is captured. Since the device knows the profile of the audio data being played back in the media elements, the device can mask the audio of the media elements being played back from the voice input received during voice input processing. Alternatively, media element audio can be ducked when an annotation is being recorded. Audio annotations can also be leveled; an audio annotation can be leveled with respect to other audio annotations on the same annotation track, across multiple annotation tracks or with respective to media element audio.

Example 9—Exemplary Determining that Voice Input Comprises an Annotation Based on Video Input Characteristics In any of the examples described herein, computing devices comprising video input devices can determine whether a viewer is speaking to the computing device based in part on video input received at the video input devices. For example, a computing device can enable a front facing camera when media playback begins and monitor the received video data during presentation payback. A front facing camera is a camera that is mounted on the same face of the computing device as a display at which media presentations can be played. The device can perform signal processing on the video input to determine if a single user is positioned in front of the device. A user is positioned in front of a device if he or she is positioned in front of the face of the computing device comprising the display that is playing the media presentation. For example, the device can determine the outline of an object positioned in a video input device field of view and if the outline matches that of a human head, torso or body, the device can determine that there is a single viewer positioned in front of the device, making it more likely that any voice input captured is meant for annotation.

Example 10—Exemplary Determining that Voice Input Comprises an Annotation Based on Other Inputs In any of the examples described herein, a computing device can comprise devices capable of determining the three-dimensional profile of objects in front of the device. One example of such a device is Microsoft's Xbox 360® Kinect® motion controller. A device can determine whether a user is speaking toward a device during media presentation playback based in part on the input received at these devices. For example, the device can determine whether the three dimensional profile of an object in front of the device is that of a single human head (torso, body), the distance from the head to the device and the direction that the head is facing. If the device determines that the viewer is speaking towards the device and is positioned within a specified distance range in front of the device, the device can determine that it is more likely that voice input received from the user is an annotation. In one example where the device is a smart-phone, digital camera or camcorder, the specified distance range is 12 to 36 inches. In another example where the device is an Xbox 360® with Kinect® motion controller, the specified distance range is 6 to 10 feet. The specified distance range can be any other range of distances that reflects that voice input comprises an annotation, and can be configured by a user or determined by the device based on parameters supplied by a user (e.g., distance from the Kinect® controller to a couch, size of the television connected to the Xbox®, etc.).

In some embodiments, annotation capture can be controlled by voice commands. For example, a computing device can be configured to process the voice input to detect audio commands (e.g., "annotate start" or "annotate stop") and begin and end the capture of annotation in response. The computing device can be configured to detect additional annotation commands such as "remove last 5 seconds," "remove first 5 seconds," "increase annotation volume," "decrease annotation volume" and "delete annotation." In addition, a video input device or other sensor can be part of a natural interface that interprets hand, face or body gestures as annotation control commands

Example 11—Exemplary Timing of Annotation Processing

In any of the examples described herein, annotation processing can be performed on the fly during media presentation playback or at a later time. For example, a computing device can buffer the incoming voice input and any other input data it is capable of receiving during presentation playback. If voice input is detected, the computing device saves the incoming voice input until it determines that the voice input does not comprise an annotation.

During on-the-fly processing, the device can be configured to postpone advancing the media presentation to the next media element if the element currently playing has finished, and an annotation currently being captured has not ended (e.g., the device has not yet detected a silence). In such a case, once the annotation has been detected to have ended, the master file can be modified to indicate that the media element that has just finished playing is to be played or presented for the duration of the annotation.

In some embodiments, the device can postpone voice input processing until after the media presentation has finished playing, when sufficient computing device resources become available, or under other device conditions. The captured voice input (and any additional input) can be delivered to a remote resource such as a cloud-based service for annotation detection and capture. The resulting annotations can be delivered back to the computing device, or the remote service can store the annotations locally and deliver links to the remotely stored annotation files to the device for inclusion into the media presentation master file.

Example 12—Exemplary User Interface During Media Presentation Playback

In any of the examples described herein, user interface elements relating to annotation are absent from the device display while the media presentation is being played. In some embodiments, annotation user interface elements can be presented to allow a user to capture annotations that would otherwise not automatically be captured by a device, such as when a user is showing a presentation of a recent vacation to a friend, is repeatedly moving his head back and forth between the device and his friends, and wants his narrative to be captured as an annotation to the presentation. Such an annotation user interface could comprise annotation user interface elements that are selected when a user hits a key or button, clicks on a user element with a mouse, or touching an element if the display is a touchscreen.

Example 13—Exemplary Detection of the End of an Annotation

In any of the examples described herein, the end of an annotation can be detected when no voice input is received for a specified period (e.g., several seconds). A pause in a person speaking does not start a new annotation unless the pause extends long enough for the device to consider the current annotation to have ended. Any further voice input determined to be an annotation starts a new annotation.

Example 14—Exemplary Handling of Voice Input from Multiple Users

In any of the examples described herein, a computing device can be configured to handle voice input from multiple users. The device can detect voice input from multiple users by, for example, determining that voice input is coming from more than one physical location based on the differences in voice input signal strength or delays in the same voice input being received at multiple audio input devices.

In some embodiments, detection of voice input coming from multiple users is discarded. In other embodiments, detection of voice input coming from multiple users simultaneously can be regarded as a single annotation. Allowing multiple voice input annotations can be desired to capture the response of a group of views to a media presentation.

Example 15—Exemplary Annotation Tracks

In any of the examples described herein, a media presentation can comprise multiple annotation tracks. An annotation track is one or more annotations created during a playback of a media presentation. The annotation data stored in the master file can contain annotation track information such as identifying information about the user who laid down the track, and when and where the track was made.

A computing device can be configured to handle the capture of an annotation that overlaps an existing annotation. In some embodiments, annotations are added to the media presentation file without checking whether the new or just-captured annotation overlaps with an existing annotation. In other embodiments, a computing device can determine whether a new annotation overlaps with an existing annotation before the new annotation is added to the media presentation. If the new annotation overlaps the existing annotation by more than an overlap amount (e.g., $\frac{1}{10}$th, $\frac{1}{2}$, 1, 2, seconds), the existing annotation may be removed from the presentation. That is, the master file annotation data is updated to remove the reference to the existing annotation. In some embodiments, existing annotations are retained to allow for features such as undo or versioning. An undo feature can allow a user to discard a new annotation and restore an existing annotation. Versioning features can associate a version number to all annotations captured during a playback and allow a user to select all annotations with a given version number (or a given version number or lower) to be played during playback, or to roll back the annotation to an indicated version (i.e., remove annotations having a version number greater than the indicated version from a presentation).

If the new annotation overlaps the captured annotation by less than the overlap amount, the existing annotation, the new annotation or both annotations can be shifted in time to avoid the overlap. The annotation data in the master file is then updated to reflect the time shift of the shifted annotations.

In some embodiments where the new annotation overlaps an existing annotation by more than an overlap amount, the computing device can split the existing annotation into two separate annotations, a first annotation segment and a second annotation segment. The device can shift the first annotation segment forward in time and the second annotations segment backward in time so that they do not overlap with the new annotation. In this case, the first and second annotations segments contain all of the information in the existing annotation. Alternatively, the first and second segments are not shifted and do not contain the portion of the existing annotation that overlapped with the new annotation.

Example 16—Exemplary Annotated Media Presentation Playback

In any of the examples described herein, annotations are played during playback of an annotated media presentation. An annotation is played during annotated media presentation playback when, according to the annotation data stored in the master file, playback has reached a point where an annotation is scheduled to begin playing. Any audio component of the media element being played when an annotation is about to be play can be muted, reduced in volume or left unaltered. The computing device can dynamically adjust the volume of the media element audio while the annotation is being played based on the characteristics of the media element audio, the annotation audio, or other characteristics of these two audio sources. For example, media element audio can be ducked when an annotation is about to begin playing. The ducking ends once the audio annotation ends.

In some embodiments, the annotation data or annotation file can contain text generated from speech recognition software and the generated text can be displayed at the device when the annotation is played. Annotation text can be presented in place of or in addition to the annotation audio. If the annotation possesses a video component, an annotation video window can appear in the device display during annotation playback. The annotation video window persists until the annotation finishes playing.

In media presentations containing multiple annotation tracks, the device can be configured to allow the user to select which annotations are to be played during media presentation playback. For example, after selecting a media presentation to be played, a user can be presented with a menu displaying information about the individual annotation tracks. Annotation track information can include the name of the person that created the annotation, the time and date the annotation track was laid down, the geographical location where the annotation track was made and the like. In some embodiments, the device automatically plays all annotation tracks.

Playback of annotated media presentations can comprise the displaying of actionable user interface elements that, when selected, provide information about the annotator or the annotation such as the annotator's name, the date the annotation was made, where the annotation was made, a link to the annotation file, or the location of the audio annotation file. For example, an actionable user interface element can appear when an audio annotation begins playing and disappears when the annotation ends. Selecting the actionable video window can provide information about the video annotation as well as the annotator.

Example 17—Exemplary Media Presentation Playback Annotation Scenarios

The following scenario illustrates an exemplary use of the media presentation playback annotation tools and technologies described herein. Consider a family taking a day trip to the beach. The family captures numerous images and videos of their outing throughout the day on their digital camera. During the drive home, the family members take turns viewing the media captured during their trip. The camera is handed to the children in the back seat, and one of the children hits the camera's "play" button. In response, the camera automatically creates a media presentation of the beach outing from the media elements captured during that day.

During a first viewing of the presentation, the children are huddled around the camera, laugh and converse with each other about the days' events as the presentation plays. During this playback, the camera detects voice input coming from multiple sources, wide variances in voice input signal strength as the children move their heads back and forth between the display and each other, and is unable to discern the outline of a single person in front of the camera from video input. The device thus determines that none of the voice input received during this first playback is intended as an annotation and no annotations are recorded.

The children then hand the camera to their mother, who is riding in the front passenger seat by herself, and she starts a second playback on the presentation. The mother directs her attention to the camera and speaks directly to the camera in response to the playback. The camera detects voice input from a single source, that the voice input is coming from directly in front of the camera, and that a single person is positioned in front of the camera. The device thus detects the mother's narration as annotations and adds her comments to the beach media presentation.

Later, once the family is home, the father transfers the media presentation files to his laptop and records his own annotations at his leisure. The father's comments are recorded as an annotation track separate from that created by the mother. The father uploads the media presentation (including the master file, the annotation files and the media element files) to a cloud-based service, and shares a link to the presentation to his relatives. The relatives access the presentation from their own network-enabled computing devices and are able to view the media presentation, along with the parents' annotations. The relatives add their own annotations, which are stored at the cloud service.

The father then views the media presentation again, to hear the comments that his relatives made while watching the beach presentation. The father accesses the beach presentation from the cloud with a Microsoft Xbox 360® gaming console, which plays the presentation at a connected smart television. The Xbox360® is also connected to a Kinect® motion controller positioned to capture input from persons located in front of the television. The father disables playback of annotation made by him and the mother so that he hears only his relatives' annotations. The father further annotates the beach presentation as views the presentation a second time. The Xbox 360® utilizes input from the Kinect® motion controller to determine that there is a viewer positioned in front of the television and that the viewer is oriented toward the television, which is used in determining that the father's voice input received at audio input devices integrated into the Xbox 360® or Kinect® controller comprises one or more annotations.

Example 18—Exemplary Method of Handling Overlapping Annotations

Figure 6:
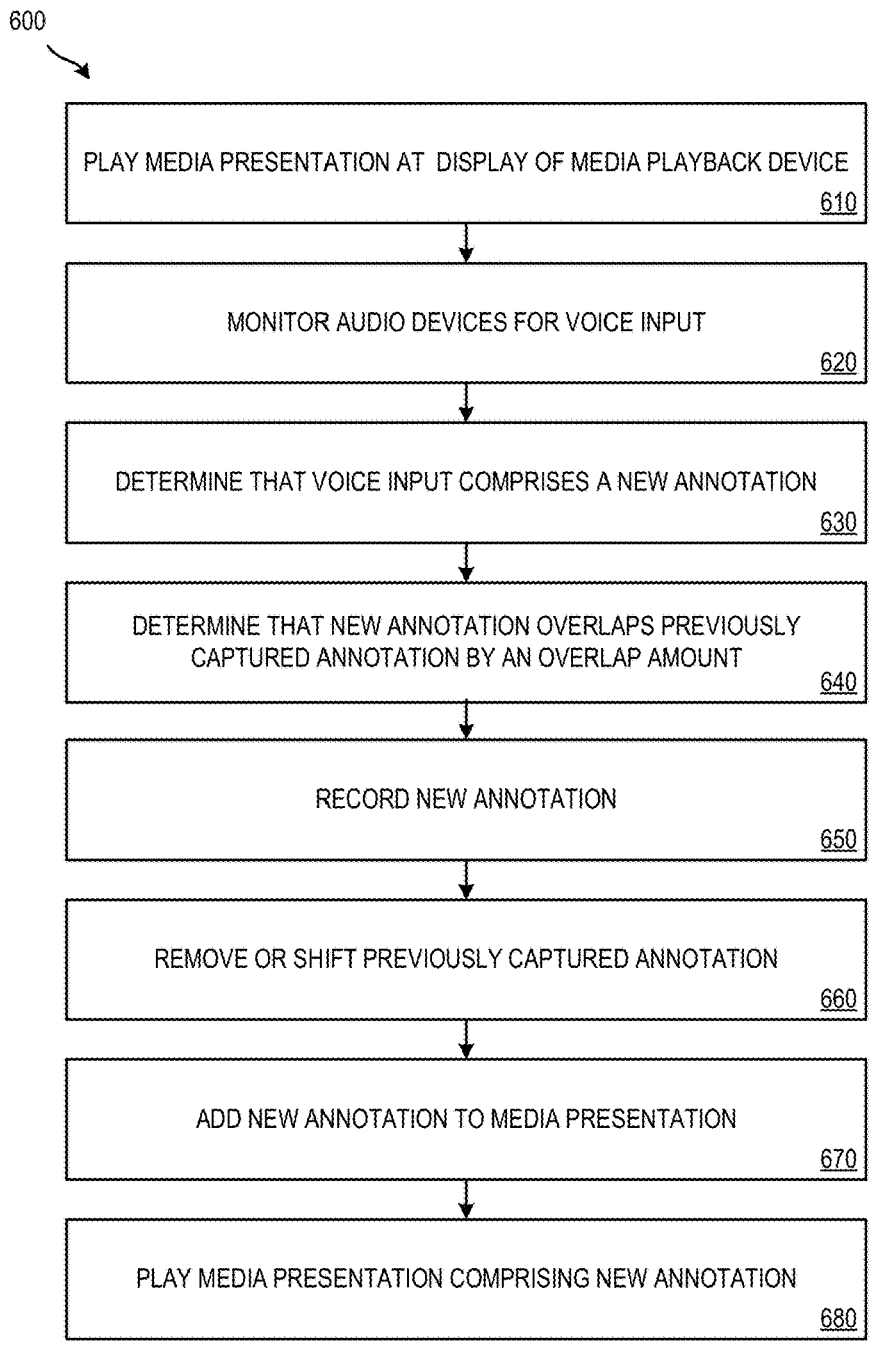
FIG. 6 is a flowchart of an exemplary method of handling overlapping annotations.

FIG. 6 is a flowchart of an exemplary method 600 of handling overlapping annotations. At 610, at least a portion of a media presentation is played back at a computing device. The media presentation is defined at least in part by a master file comprising annotation data indicating when an existing annotation is to be played during playback of the media presentation. The computing device comprises one or more audio input devices. At 620, the one or more audio input devices are monitored for voice input during the playing. At 630, the voice input is determined to comprise a new annotation to be added to the media presentation. At 640, the new annotation is recorded in response to the determination.

At 650, the new annotation is determined to overlap the existing annotation by an overlap amount. At 660, the annotation data is modified to remove the existing annotation from the media presentation if the overlap amount exceeds an overlap threshold. If the overlap amount is less than the overlap threshold, the annotation data is modified to shift the time at which the existing annotation begins playing during playback of the media presentation so that the existing annotation no longer overlaps with the new annotation. At 670, the new annotation is added to the media presentation. Adding the new annotation to the media presentation comprises adding annotation data to the master file indicating the time at which the new annotation is to start playing during playback of the media presentation playback and a reference to an annotation file storing the new annotation. At 680, after the new annotation is added to the media presentation, the media presentation is played and the new annotation is played as part of the media presentation.

Methods in Computer-Readable Media

In any of the examples described herein, any of the computer-executable instructions for implementing the disclosed techniques as well as any data created and used during implementation of the disclosed embodiments can be stored on one or more computer-readable media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other computing devices that include computing hardware). Computer-readable media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

Alternatives

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Additional Information

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Having illustrated and described the principles of the illustrated embodiments, the embodiments can be modified in various arrangements while remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of annotating a media presentation, the method comprising:
    playing at least a portion of the media presentation at a computing device comprising one or more audio input devices and one or more video input devices;
    monitoring the one or more video input devices for video input received during the playing, wherein the one or more video input devices capture video input of a user during the playing of the media presentation;
    upon determining, based at least in part upon the video input and without manual interaction with the computing device, that the user is speaking in a direction of the computing device:
        creating an annotation by receiving, via the one or more audio input devices, voice input comprising the annotation to be added to the media presentation; and
        adding the annotation to the media presentation;
    wherein determining that the user is speaking in the direction of the computing device comprises:
        determining a distance from the user to the computing device; and
        determining a direction that the user's head is facing.

2. The method of claim 1, wherein the monitoring begins in response to the playing at least a portion of the media presentation beginning.

3. The method of claim 1, the annotation comprising a portion of the video input received by the one or more video input devices.

4. The method of claim 1, wherein the determining comprises determining that the user is positioned in front of the computing device.

5. The method of claim 1, wherein the computing device comprises an input device capable of determining a distance that the user is positioned from the computing device, the determining that the user is speaking in the direction of the computing device comprising determining that the user is positioned within a specified distance range in front of the computing device.

6. The method of claim 1, the computing device comprising a display, the media presentation being played back at the display during the playing, user interface elements related to annotation being absent from the display during the playing.

7. The method of claim 1, the determining that the user is speaking in the direction of the computing device being based only on the video input.

8. The method of claim 1, the receiving voice input comprising the annotation comprises capturing the annotation while a media element of the media presentation is playing, the method further comprising:
    determining that the capturing of the annotation extends past a time that the media element stops playing in the media presentation; and
    modifying the media presentation such that the media element is scheduled to be played for the duration of the annotation.

9. The method of claim 1, the method further comprising:
    after the adding the annotation to the media presentation, playing the media presentation at the computing device or another computing device, the playing comprising playing the annotation.

10. The method of claim 1, wherein determining that the user is speaking in the direction of the computing device further comprises:
    determining a three-dimensional profile of the user using the one or more video input devices, wherein the distance from the user and the direction that the user's head is facing are obtained from the three-dimensional profile.

11. The method of claim 1, wherein determining, based at least in part upon the video input, that a user is speaking in the direction of the computing device comprises:
    receiving a gesture command from the user to create an annotation.

12. The method of claim 11, wherein the gesture command is a hand, face, or body gesture recognized via the video input.

13. The method of claim 11, wherein the gesture command is a command to start recording the voice input for the annotation.

14. The method of claim 1, wherein determining the distance from the user to the computing device comprises:
    determining that the user is within a specified distance range from the computing distance.

15. The method of claim 1, further comprising:
    upon determining that the user is not speaking in the direction of the computing device:
        determining that the voice input does not comprise an annotation to be added to the media presentation.

16. A computing device comprising:
    a processing unit;
    memory;
    one or more audio input devices; and
    one or more video input devices;
    the computing device configured to perform operations for annotating a media presentation, the operations comprising:
        playing at least a portion of the media presentation;
        monitoring the one or more video input devices for video input received during the playing, wherein the one or more video input devices capture video input of a user during the playing of the media presentation;
        upon determining, based at least in part upon the video input and without manual interaction with the computing device, that the user is speaking in a direction of the computing device:
            creating an annotation by receiving, via the one or more audio input devices, voice input comprising the annotation to be added to the media presentation; and
            adding the annotation to the media presentation;
        wherein determining that the user is speaking in the direction of the computing device comprises:
            determining a distance from the user to the computing device; and
            determining a direction that the user's head is facing.

17. The computing device of claim 16, wherein determining, based at least in part upon the video input, that a user intends to create an annotation comprises:
    receiving a gesture command from the user that indicates the user's intention to create an annotation.

18. The computing device of claim 17, wherein the gesture command is a hand, face, or body gesture recognized via the video input.

19. One or more computer-readable memory or storage devices storing computer executable code that when executed by a computing device performs operations for annotating a media presentation, the operations comprising:
  playing at least a portion of the media presentation at the computing device comprising one or more audio input devices and one or more video input devices;
  monitoring the one or more video input devices for video input received during the playing, wherein the one or more video input devices capture video input of a user during the playing of the media presentation;
  upon determining, based at least in part upon the video input and without manual interaction with the computing device, that the user is speaking in a direction of the computing device:
    creating an annotation by receiving, via the one or more audio input devices, voice input comprising the annotation to be added to the media presentation; and
    adding the annotation to the media presentation;
  wherein determining that the user is speaking in the direction of the computing device comprises:
    determining a distance from the user to the computing device; and
    determining a direction that the user's head is facing.

* * * * *